April 4, 1961     W. A. ROBIRDS     2,978,596
PORTABLE CONVERSION UNIT
Filed June 11, 1959     2 Sheets-Sheet 1

INVENTOR.
WILLIAM A. ROBIRDS
BY
Thomas P. Mahoney
ATTORNEY

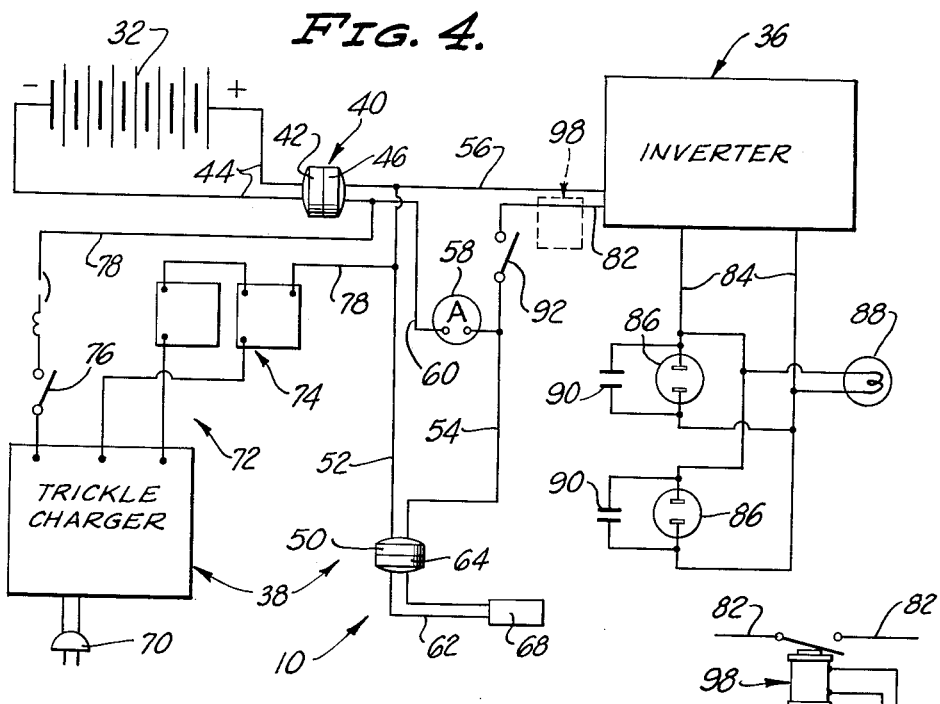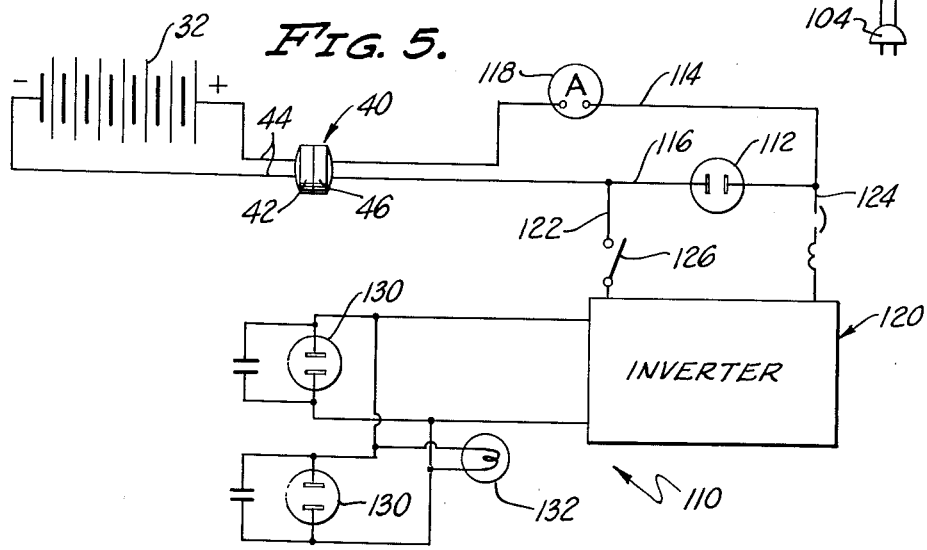

United States Patent Office 2,978,596
Patented Apr. 4, 1961

2,978,596

PORTABLE CONVERSION UNIT

William A. Robirds, 12282 Gamma St.,
Garden Grove, Calif.

Filed June 11, 1959, Ser. No. 819,705

2 Claims. (Cl. 307—151)

This invention relates to a portable electrical power conversion unit and, more particularly, to such a unit which is characterized by both its flexibility of operation and the relative ease with which it may be transported.

Prior art portable electrical power units usually consist of a chargeable electric battery and associated charging circuit adapted to facilitate the charging of the battery whereby, during periods when the power units are not in use, the units can be recharged by connecting them to a charging current source. Therefore, when the device is being charged it is not available for use as a power source.

An object of my invention is the provision of a portable electric power unit which incorporates a storage battery and means for charging said storage battery which will permit said power unit to be utilized as a power source during the charging process. For instance, the device of my invention includes A.C. and D.C. charging circuits and A.C. output receptacles. Therefore, when the storage battery of the power unit is being charged from a direct current source, such as an automobile generator, the A.C. outlets can be utilized to energize electrical devices which incorporate A.C. motors or circuits.

Another object of my invention is the provision of a portable electric power unit which is incorporated in a two-part housing consisting of first and second housing members. The storage battery of the power unit is enclosed in one of the parts of the housing and the charging and inverter circuits are disposed in the other part of the housing. When in use the two parts of the housing are maintained in operative relationship by mutually engaging latch means thereupon and the storage battery and charging and inverter circuits are operatively connected to each other by means of a disconnect plug interposed therebetween.

However, when it is desired to transport the unit, the two parts of the housing are separated from each other and thus the transportation thereof is rendered feasible despite the weight of the housing when the two parts thereof are connected to each other.

A further object of my invention is the provision of a portable electric power unit which is characterized by the fact that it may be charged both from A.C. and D.C. current sources and thus can be charged from such sources by the simple expedient of utilizing one or the other of said power sources.

A further object of my invention is the provision of a power unit of the aforementioned character which, in addition to being usable as a source of power while being charged from a D.C. current source, may also be utilized as a source of power while being charged from an A.C. current source.

Another object of my invention is the provision of a portable electric power unit which may be used as an automatically energizable emergency power source so that, should the regular power source fail in a critical environment, such as a hospital operating room, the power unit of my invention will automatically deliver either A.C. or D.C. power until the regular power has been restored.

Other objects and advantages of my invention will be apparent from the following specification and the accompanying drawings which are for the purpose of illustration only and in which:

Fig. 4 is a circuit diagram of one embodiment of the power unit;

Fig. 5 is a circuit diagram of another embodiment of the power unit; and

Fig. 6 is a fragmentary detail showing the manner in which a normally open relay can be incorporated in the power unit to accomplish automatic energization of said power unit under emergency conditions.

Figure 1:
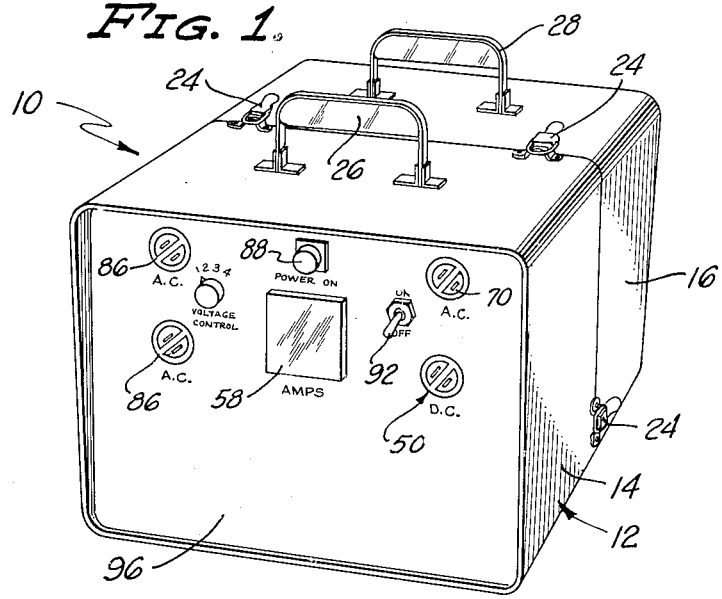
Fig. 1 is a perspective view showing the two-part housing of the power unit.
Figure 2:
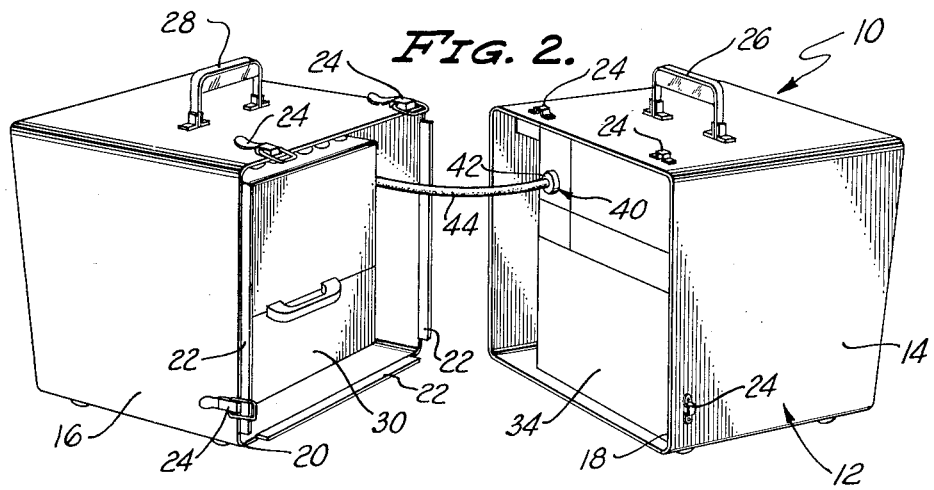
Fig. 2 is a perspective view showing the two parts of the housing of the power unit dismounted from operative relationship with each other.
Figure 3:
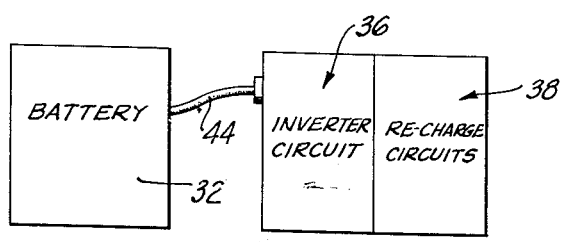
Fig. 3 is a schematic representation showing the manner in which the battery of the power unit is located in one part of the housing and the inverter and charging circuits are located in the other part of the housing and connected to each other by a quick disconnect plug.

Referring to the drawings, and particularly to Figs. 1–2 thereof, I show a portable, electrical power unit 10 constructed in accordance with the teachings of my invention and incorporated in a two-part housing 12, said two-part housing being constituted by a first part 14 and a second part 16.

The first and second parts 14 and 16 of the housing are formed from sheet metal and are symmetrically shaped so that the abutting edges 18 and 20 of said first and second parts meet with each other when said first and second parts are juxtaposed to each other, as best shown in Fig. 1 of the drawings. The second part 16 of the housing 12 is provided on its vertical edges with projecting flanges 22 adapted to fit within the first part 14 of the housing 12 to properly align the first and second parts 14 and 16 of the housing 12 with each other.

Mounted adjacent the abutting edges 18 and 20 of the first and second parts 14 and 16 of the housing 12 are cooperative latch means 24 adapted to maintain said first and second parts in operative engagement with each other or, alternatively, to permit said first and second parts to be dismounted from operative engagement with each other to facilitate the transportation of the first and second parts 14 and 16 of the housing 12, in a manner to be described in greater detail hereinbelow.

Handle means 26 is mounted on the top of the first part 14 of the housing 12 and corresponding separate handle means 28 is mounted upon the top of the second part 16 of the housing 12 to facilitate the separate transportation of said first and second parts. Therefore, when the cooperative latch means 24 on the first and second parts 14 and 16, respectively, of the housing 12 are disengaged, a person can carry the said first and second parts separately to equalize the weight of said first and second parts.

Mounted within the second part 16 of the housing 12 is a sheet metal battery enclosure 30 incorporating a storage battery 32. A similar sheet metal enclosure 34 is mounted within the first part 14 of the housing 12 and incorporates the inverter circuit 36 and recharge circuits 38 in a manner to be described in greater detail below. A quick disconnect plug means 40 in the form of a male plug 42 connected to the battery 32 by means of a cable 44 and a female receptacle 46 mounted in the wall of the enclosure 34 constitute the separable electrical connection between the battery 32 and the inverter and recharge circuits 36 and 38, respectively.

The power unit 10, as best shown in the circuit diagram of Fig. 4, includes a D.C. receptacle 50 which is connected to one extremity of a D.C. charging circuit constituted by leads 52 and 54, the lead 52 being directly connected to a lead 56 terminating at the female quick disconnect receptacle 46 and the lead 54 being connected to one side of an ammeter 58 whose other side is connected by a lead 60 to the female quick disconnect receptacle 46.

Therefore, when it is desired to charge the battery 32 through the utilization of the direct current charging circuit, a cable 62 having a male plug 64 at one extremity and another male plug 68 at its other extremity is operatively connected to the D.C. charging circuit by inserting the male plug 64 in the D.C. receptacle 50. The male plug 68 which, in the present instance, is adapted to fit within the cigarette lighter of an automobile or other source of direct current, may be so inserted and direct current caused to flow through the D.C. charging circuit to the battery 32. In the case of an automobile the direct current is generated by the generator associated with the engine of the automobile and the charging rate will be indicated upon the ammeter 58 as direct current flows therethrough.

The A.C. charging circuit includes a receptacle 70 and a trickle charger indicated generally at 72. The trickle charger 72 includes a transformer, not shown, and a rectifier bank 74. A switch 76 is incorporated in the A.C. charging circuit which may be opened or closed to permit the A.C. charging circuit to charge the battery 32. The output side of the rectifier bank 74 and trickle charger 72 is connected through leads 78 to the female quick disconnect receptacle 46.

Therefore when a cable connected to a source of A.C. current is, in turn, connected to the receptacle 70 the A.C. current will be rectified to charge the battery 32. In this manner the battery 32 can be charged from either a D.C. or A.C. current source, thus greatly facilitating the utilization of the power unit 10 of the invention. Operatively connected to the battery 32 through leads 82 is the inverter 36 which is of conventional construction and which is adapted to convert the D.C. output of the battery 32 to A.C. current and to impress said current on leads 84 which are connected to A.C. output receptacles 86 having a warning light 88 operatively connected thereto. Filters 90 isolate the receptacles 86 from the inverter 36. Therefore, when it is necessary to utilize the A.C. output receptacles 86 to provide A.C. current for a device energizable thereby a normally open on-off switch 92 is closed. This will cause direct current to flow from the battery 32 through the cable 44 to the quick disconnect plug 40 and thence through the leads 56 and 82 to the inverter 36 where the direct current is converted to alternating current and impressed upon the A.C. receptacles and the warning light 88 indicating that the inverter 36 is operating.

Because of the provision of the D.C. and A.C. charging circuits and the A.C. outlet receptacles, it is possible to utilize the A.C. outlet receptacles 86 when the battery 32 is being charged by either the A.C. or the D.C. charging circuits. Moreover, the D.C. receptacle 50 can be utilized as an outlet receptacle from the battery 32 when it is desired to use the power unit 10 as a source of D.C. current. Moreover, the battery 32 can be utilized as a source of D.C. current while the battery 32 is being charged from an alternating current source through the A.C. charging circuit.

It will be noted that the D.C. receptacle 50 and the A.C. charging receptacle 70 are mounted in an instrument panel 96 on one extremity of the first part 14 of the housing 12. Also mounted on the panel 96 are the warning light 88, the on-off switch 92 for the inverter 36 and the ammeter 58. In addition, the A.C. outlet receptacles 86 are also mounted in the panel 96.

The portable power unit 10 is adapted to be utilized as an automatically energizable emergency power source by the incorporation therein of a normally open relay 98 which is interposed in the lead 82 after the switch 92. The relay 98 is energized through leads 102 by a plug 104 connected to a source of alternating current which is the normal power source.

In utilizing the power unit 10 as an emergency source of A.C. current the switch 92 is closed but the normally open relay 98 prevents the flow of D.C. current from the battery to the inverter 36. However, if the normal supply of A.C. current should fail the normally open relay 98 will be deenergized because of the current failure and will close to connect the inverter to the battery 32, thus causing alternating current to be impressed upon the A.C. receptacles 86 which will automatically energize the electrically driven devices connected thereto. In this manner instantaneous energization of electrical devices energizable by A.C. power can be obtained.

An alternative form 110 of the power unit of my invention is shown in Fig. 5 of the drawings and includes a storage battery 42 connectable through the quick disconnect plug 40 to a D.C. charging circuit which includes a D.C. receptacle 112 connected through leads 114 and 116 to the battery 32. An ammeter 118 is connected in the lead 114 to indicate the charging rate when the receptacle 112 is connected to a source of D.C. current. The D.C. receptacle 112 will also serve as a source of D.C. current when the receptacle is utilized as such a source for a D.C. powered device. An inverter 120 is connected to the leads 114 and 116 by leads 122 and 124, the lead 122 having an on-off switch 126 therein which controls energization of the inverter 120. When the switch 126 is closed, direct current flows through the leads 114 and 116 to the leads 122 and 124, respectively, and will cause the inverter to deliver A.C. potential to A.C. receptacles 130 and to energize a warning light 132.

The power unit 110 can be utilized to deliver A.C. current through the receptacles 130 while being charged through the D.C. charging circuit and the associated D.C. receptacle 112. Therefore, it is possible to charge the storage battery 32 while utilizing the power unit 110 as a source of A.C. current.

I thus provide by my invention a power unit which is characterized by the facility with which it may be used to supply either direct or alternating current and, in the case of the power unit 10, the device is characterized by the fact that the battery constituting a part of the same may be charged from either a direct or A.C. current source while still providing alternating current at the alternating current receptacles. Moreover, the housing construction facilitates the transportation of the relatively heavy components and renders the unit portable while still permitting the conjoint use of the two housing parts as a unitary housing structure.

This application is a continuation-in-part of my copending application for Portable Conversion Unit, Serial No. 701,854, filed December 10, 1957.

I claim:

1. In a portable, electrical power source, the combination of: a storage battery; a D.C. charging circuit having one end terminating at said storage battery and its other end terminating in a D.C. input-output receptacle; an A.C. charging circuit having one end terminating in an A.C. input receptacle and its other end terminating at said battery; an inverter connected to said battery; A.C. output receptacle means connected to said battery through said inverter; a housing consisting of first and second housing members, said first housing member being adapted to receive said battery and said second housing member being adapted to receive said A.C. input receptacle and charging circuit, said D.C. input-output receptacle and charging circuit and said A.C. output receptacles and inverter; and a common connector plug interposed between said first and second housing members and said battery and said A.C. and D.C. charging circuits and said A.C. output and inverter circuits, said first and second housing members having cooperative edge portions and latch means thereupon adapted to demountably secure said first and second housing members in operative engagement with each other.

2. In a portable, electrical power source, the combination of: a storage battery; a D.C. charging circuit having one end terminating at said storage battery and its other end terminating in a D.C. input-output receptacle; an A.C. charging circuit having one end terminating in an A.C. input receptacle and its other end terminating at said battery; an inverter connected to said battery; A.C. output receptacle means connected to said battery through said inverter; a housing consisting of first and second housing members, said first housing member being adapted to receive said battery and said second housing member being adapted to receive said A.C. input receptacle and charging circuit, said D.C. input-output receptacle and charging circuit and said A.C. output receptacles and inverter; and a common connector plug interposed between said first and second housing members and said battery and said A.C. and D.C. charging circuits and said A.C. output and inverter circuits, said first and second housing members having cooperative edge portions and latch means thereupon adapted to demountably secure said first and second housing members in operative engagement with each other and said first and second housing members having separate handle means thereupon adapted to facilitate the separate transportation of said first and second housing members when said first and second housing members and said connector plug have been disconnected from one another.

References Cited in the file of this patent

UNITED STATES PATENTS

| | | |
|---|---|---|
| 1,518,508 | Hart | Dec. 9, 1924 |
| 1,653,579 | Marko | Dec. 20, 1927 |
| 2,423,646 | Flippen et al. | July 8, 1947 |
| 2,490,859 | DeWitt | Dec. 13, 1949 |
| 2,555,630 | Bishner | June 5, 1951 |